Jan. 12, 1926.

N. L. HALL

SAUSAGE SANDWICH AND ROLL THEREFOR

Filed Oct. 26, 1921

1,569,121

Inventor
Newton L. Hall.
By Frederic B. Wright
Attorney

Patented Jan. 12, 1926.

1,569,121

UNITED STATES PATENT OFFICE.

NEWTON L. HALL, OF SALT LAKE CITY, UTAH.

SAUSAGE SANDWICH AND ROLL THEREFOR.

Application filed October 26, 1921. Serial No. 510,517.

*To all whom it may concern:*

Be it known that I, NEWTON L. HALL, a citizen of the United States, residing at Salt Lake City, in the county of Salt Lake and State of Utah, have invented certain new and useful Improvements in Sausage Sandwiches and Rolls Therefor, of which the following is a specification.

This invention relates to articles of food, and particularly to sausage sandwiches.

The ordinary sausage sandwich as commonly dispensed consists of a roll which has been split and buttered, with a link of sausage disposed within the roll. In forming this sandwich, it is common for the rolls to be split while the sausage is boiling or being otherwise cooked. A liberal supply of butter is then brushed or otherwise applied to the split roll, the link of sausage is placed between the roll, and the roll closed on the sausage. This is done entirely by hand and inasmuch as these articles of food are dispensed at country fairs, baseball games, race tracks, etc., and dispensed in a considerable hurry, no great amount of cleanliness in handling is possible. The sausage is picked up in the none-too-clean fingers of the dispenser and placed between the roll and then the roll is grasped by the hand of the dispenser and closed tightly upon the sausage, causing the melted butter and drippings to ooze out. If the butter is not fully melted, it will be softened or melted by the placing of the hot sausage within the split roll, and as a consequence when this sandwich is delivered to the consumer the melted butter is very liable to drip from the sausage. This is particularly true when the sandwich is being eaten and melted butter exudes from between the slices of roll onto the hands of the consumer and drips onto his clothes.

Another reason for this tendency of the butter or mustard to drip from the sandwich is the fact that the sausage as it comes from the boiler or from the frying pan or cooker is very liable to be curved instead of straight, so that it does not lie evenly between the halves of the roll but is bound to project therefrom. Thus the projecting portion of the sausage is liable to be handled and the two halves of the roll cannot be held together tightly enough to prevent the oozing out of the butter or mustard.

My invention has for its object the provision of an improved roll particularly designed to be used with the ordinary cylindrical sausage, the roll being so designed in the first place that the sausage may be disposed within the roll without the necessity of handling the sausage itself, thus doing away with one of the unhygienic features.

And a further object is to so form the roll that the melted butter or mustard which may be applied to the sausage or the interior of the roll will not drip out of the roll but that the roll will form a container both for the sausage and the butter, mustard, or other drippings.

Still another object is to provide a roll which is longitudinally split so that the sausage may be readily inserted within the roll without the necessity of splitting the roll by cutting, and that butter or mustard may be applied to the roll and sausage without the necessity of applying the butter or mustard within the roll and so that the butter or mustard may be applied after the sausage has been inserted within the roll, the initially split roll furthermore permitting sausages to be inserted having various diameters without any chance of accidentally splitting or breaking the roll.

A further object is to provide a hollow roll of a form adapted to receive the sausage and which may be readily formed from dough and readily cooked, this roll being slotted at one or more points so that the sausage may be readily inserted within the roll and butter or other condiment applied thereto and, if desired, the sausage can be cut in line with the slot while within the roll.

Other objects will appear in the course of the following description.

My invention is illustrated in the accompanying drawings, wherein :—

Figure 1:
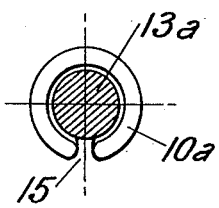
Figure 1 is a section of the sandwich shown in Figure 2 on the line 1—1.
Figure 3:
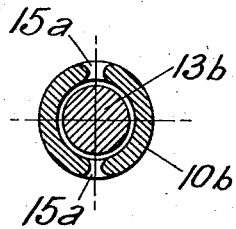
Figure 3 is a section of the sandwich shown in Figure 4 on the line 3—3.
Figure 2:
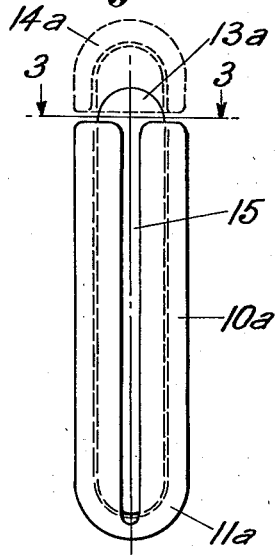
Figure 2 is a side elevation of a form of sandwich, showing in dotted lines the manner in which a cap may be applied thereto.

Referring to these drawings, and particularly to Figure 2, it will be seen that this form of roll consists of a hollow, cylindrical shell or sheath of baked or fried dough and having the consistency and general character of what is known as a roll, this sheath being designated 10. This sheath is closed at one end, as at 11, and the hollow interior 12 of the sheath is of sufficient size so as to permit the ready insertion of the cylindrical sausage 13. This sausage 13 is preferably longer than the body 10 of the roll, and a cap 14 or second section which is hollow and cylindrical is disposed over the protruding end of the sausage so as to be held firmly in place by the sausage and with the confronting end faces of the body 10 and cap 14 in contiguity. With a roll of this character, it is obvious that butter or mustard may be applied around the protruding end of the sausage 13 or around the end of the body 10, and after the cap has been put in place the hot sausage will cause the butter or mustard to melt and pass down into the space between the sausage and the body 10 or cap 14. A sandwich of this character has the sausage entirely enclosed so as to protect it from handling, and provides a roll in which the sausage may be placed without coming in contact with the hand, as it is obvious that the sausage may be boiled or otherwise cooked upon a spit and inserted within the roll, then by grasping the roll the spit may be withdrawn, leaving the sausage inserted therein, and then it is only necessary to apply the cap 14.

In order to permit the ready insertion of the sausage into the roll, the roll is longitudinally slotted at one point, as at 15, this slot extending the full length of the roll and preferably extending below the inner end of the sausage. This slot not only permits the ready insertion of the sausage into the roll, but provides for the application of mustard and butter thereto, it being only necessary to place the butter or mustard within the slot, whereupon the heat of the sausage which has just been taken from the hot water or from the frying pan causes the butter or mustard to melt and seep in between the exterior of the sausage and the inner face of the roll. It will be seen that in this form of the invention the lower end of the roll is closed and the side wall of the roll is closed except at one point, that is the slot 15.

Figure 4:
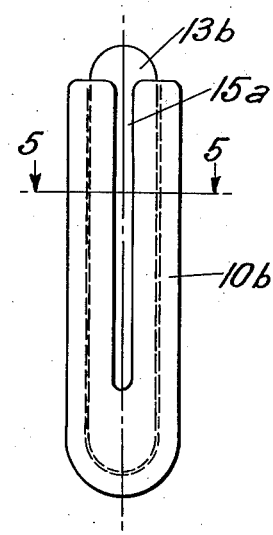
Figure 4 is a side elevation of a sandwich, in which the roll is formed with two diametrically disposed slots.

In Figure 4, I show another form of roll, which is like that shown in Figure 2 but is formed with two relatively short slots. The body of the roll 10$^b$ is of the same character as the roll 10, but at diametrically opposite points is formed with the longitudinally extending slots 15$^a$. These slots, however, need not extend so far down in the roll as the single slot 15 shown in Figure 2. Of course, the slots afford more room for the application of butter or mustard or other condiment to the sausage 13$^b$. Otherwise than this, the roll acts in precisely the same way as it does in Figure 2. Both of the constructions shown in Figure 2 and Figure 4 may be provided with caps 14 as in Figure 2 if desired.

Figure 5:
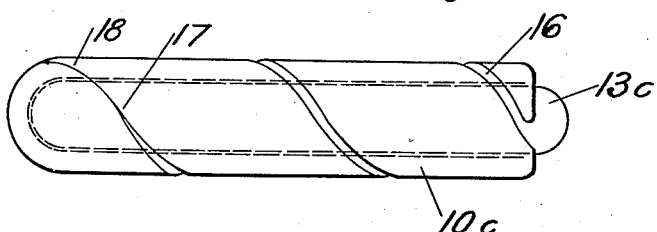
Figure 5 is a side elevation of another form of sandwich, in which the roll is formed with a single spirally extending slot.
Figure 6:
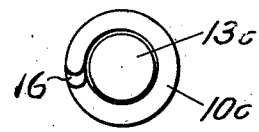
Figure 6 is an end elevation of the sandwich shown in Figure 5.

In Figure 5, I show still another form of roll, the roll being designated 10$^c$ and the sausage 13$^c$. In this form the roll is entirely closed at one end and open at the other and is cylindrical and hollow, but the slot in the roll is a longitudinally extending spiral slot, designated 16, and extending from the open end of the roll nearly to the closed end thereof, as for instance at 17. This roll will be preferably formed by wrapping a strip of dough spirally around a form, the side edges of the strip being approximated beyond the point 17 so that when the roll is baked the seam 18 will be closed, leaving the slot 16 open from the point 17 to the extremity of the roll. This also may be used with a cap if desired, and it is obvious that the slot 16 will render the roll more or less expansible and permit the ready insertion of the sausage 13$^c$, and that the butter, mustard or other condiment may be readily applied to the sausage through the slot 16.

It is to be noted that the roll formed as described is a self-supporting article, that is it does not have to be supported by any extraneous means. I am aware that in making meat pies, it is common to line a dish with pie crust, place therein an edible in the nature of a stew, cover over the top with pie crust, and then bake, but the pie crust bottom and top is not a self-supporting structure or an article of manufacture which could be sold by itself and into which an edible unit may be inserted.

Attention is called to the fact that the sausage is a preformed commercial article so formed that it may be inserted as a whole into the interior of the roll, in other words that inasmuch as the filling or stuffing of the sausage is enclosed within a skin and is cooked that way as a unitary article, it may be inserted as a unitary article into the interior of the roll, whereas if the meat was not enclosed within a skin it would have to be stuffed into the interior of the roll, which could not be readily done by machinery. By using the sausage, however, it is an easy matter to cook the sausage on spits either in boiling water or in deep grease, to insert the spitted sausage into the interior of the roll, and then remove the spit without the sausage coming in contact with the hands of the cook.

I contemplate that the rolls shall also be baked and the sausage inserted and the roll placed in a paper case or sheath without either the roll or the sausage coming in contact with the hands. This is particularly rendered necessary by the fact that the hands of those who cook sausages and make sandwiches for baseball games, country fairs, race tracks, etc., are very rarely clean and the placing of this sandwich within an enveloping sheath of waxed paper is particularly desirable because of the fact that the sandwiches when sold at a ball park or under other like circumstances are passed from the vender up to the buyer and that this necessitates the passing from hand to hand. Even without the use of an enveloping paper sheath, the roll construction which I have devised prevents to a large extent the contact of many hands with the sausage and prevents the butter or mustard from oozing out upon the exterior of the roll and being touched by the hands of those who are passing the sandwich up to the buyer.

Where the sausage is curved or rendered crooked by cooking, as before stated it projects at one end laterally from between two slices of roll so that it is more than ever liable to come in contact with the hands, either of the vender or of the persons passing it to the buyer. By the use of my roll, the sausage is straightened, that is when the sausage is taken from the pot or from the cooker it is relatively flexible and may be readily inserted in the roll and then the roll holds it straight, making a compact sandwich in which but a very small portion of the sausage projects.

The form of roll is such that it may be readily inserted within a paper sheath of relatively small dimensions, which is not the case with the present sausage sandwich. While preferably the roll will be made of bread dough or of dough such as ordinarily used in making rolls, yet obviously it might be made of other edible dough and be in the form of a cake or biscuit, as distinguished from a roll.

It is to be particularly noted that the slots formed in the roll permit the sausage to be slit after it is inserted in the roll by a knife passed downward through the slots of the roll. Thus the mustard, butter or other condiment will be readily applied to the interior of the sausage without the sausage coming in contact with the hands. It is also to be noted that sausage of the kind used in sausage sandwiches vary somewhat in diameter and that if the roll constructed as shown were not originally slitted either spirally or parallel to the axis of the roll, the insertion of a slightly larger sausage into the roll would tend to split the roll irregularly, whereas the provision of the slot 15 or the slot 16 permits the roll to slightly expand when a relatively larger sausage is inserted and thus prevent this accidental splitting of the roll.

I claim:—

1. An article of food including a hollow, relatively elongated, approximately cylindrical, self-supporting roll open at one end, the wall of the roll being slotted.

2. As an article of food, a hollow, approximately cylindrical, relatively elongated self-supporting roll open at one end and closed at the other, the wall of the roll being slotted from a point adjacent the closed end to and through the open end.

3. An article of food including a hollow, approximately cylindrical, relatively elongated roll open at one end and closed at the other, the wall of the roll having a helically disposed slot extending from the closed end of the roll to and through the open end, the hollow interior of the roll being adapted to contain an edible filling.

In testimony whereof I affix my signature.

NEWTON L. HALL.